United States Patent
Nelbach, Jr. et al.

(10) Patent No.: US 11,461,278 B2
(45) Date of Patent: *Oct. 4, 2022

(54) DISPARATE WORKFLOW INTEGRATION USING A MESHED VISUALIZATION CANVAS

(71) Applicant: Prysm, Inc., San Jose, CA (US)

(72) Inventors: Francis Joseph Nelbach, Jr., San Jose, CA (US); Stephan Christopher Nagy, Fishers, IN (US); Adam P. Cuzzort, Westfield, IN (US)

(73) Assignee: Sococo, LLC, Austin, TX (US)

( * ) Notice: Subject to any disclaimer, the term of this patent is extended or adjusted under 35 U.S.C. 154(b) by 60 days.

This patent is subject to a terminal disclaimer.

(21) Appl. No.: 16/123,746

(22) Filed: Sep. 6, 2018

(65) Prior Publication Data

US 2019/0087438 A1 Mar. 21, 2019

Related U.S. Application Data

(60) Provisional application No. 62/560,062, filed on Sep. 18, 2017.

(51) Int. Cl.
| | |
|---|---|
| *G06F 16/176* | (2019.01) |
| *G06F 3/14* | (2006.01) |
| *G06F 9/54* | (2006.01) |
| *G06F 16/438* | (2019.01) |
| *G06F 3/16* | (2006.01) |

(52) U.S. Cl.
CPC .......... *G06F 16/176* (2019.01); *G06F 3/1423* (2013.01); *G06F 3/1454* (2013.01); *G06F 3/167* (2013.01); *G06F 9/542* (2013.01); *G06F 16/4393* (2019.01); *G09G 2340/045* (2013.01); *G09G 2340/0442* (2013.01); *G09G 2370/022* (2013.01); *G09G 2370/16* (2013.01); *G09G 2370/24* (2013.01)

(58) Field of Classification Search
None
See application file for complete search history.

(56) References Cited

U.S. PATENT DOCUMENTS

| | | | |
|---|---|---|---|
| 2006/0238548 A1* | 10/2006 | Stotts, Jr. .............. | G06F 3/0304 345/629 |
| 2007/0156689 A1* | 7/2007 | Meek ...................... | G06F 9/541 |
| 2008/0008458 A1* | 1/2008 | Gudipaty ............. | G11B 27/105 386/240 |
| 2008/0282160 A1* | 11/2008 | Tonnison ................ | G06F 9/451 715/704 |
| 2011/0276619 A1* | 11/2011 | Khan ...................... | H04L 67/08 709/203 |
| 2013/0083210 A1* | 4/2013 | Beckham ........... | H04N 21/4223 348/207.11 |

(Continued)

*Primary Examiner* — Uyen T Le

(57) ABSTRACT

Techniques are described to support shared applications, including a shared application that permits retrieval, presentation and traversal of information resources. The innovative techniques enable multiple participants at different locations to both see and interact with assets such as a web-based content. The innovative techniques centralize the functionality of an application that is to be shared. A shared application is executed, during a collaboration, at a centralized location in a manner that does not require any local resources to create an application instance.

20 Claims, 8 Drawing Sheets

(56) References Cited

U.S. PATENT DOCUMENTS

| | | | |
|---|---|---|---|
| 2013/0138810 A1* | 5/2013 | Binyamin | G06F 9/5072 |
| | | | 709/225 |
| 2014/0047236 A1* | 2/2014 | Russell | G06F 16/176 |
| | | | 713/168 |
| 2014/0223490 A1* | 8/2014 | Pan | H04N 21/8186 |
| | | | 345/173 |
| 2017/0228359 A1* | 8/2017 | Cuzzort | G06F 3/1454 |
| 2017/0230440 A1* | 8/2017 | Carlos | H04L 65/605 |
| 2017/0269976 A1* | 9/2017 | Venkataraman | G06F 21/6245 |
| 2018/0309804 A1* | 10/2018 | Nagy | H04L 51/18 |

* cited by examiner

DISPARATE WORKFLOW INTEGRATION USING A MESHED VISUALIZATION CANVAS

CLAIM OF PRIORITY

This application claims priority under 35 U.S.C. § 119(e) to U.S. Provisional Patent Application No. 62/560,062, filed Sep. 18, 2017, and titled "Disparate Workflow Integration Using a Meshed Visualization Canvas" the entire disclosure of which is hereby incorporated by reference.

BACKGROUND

Shared workspaces may be implemented via a network to support a virtual environment in which users are able to share assets such as applications, content, video conferencing, annotations, and other media across a plurality of appliances. Shared workspaces thus enable users distributed over a variety of geographic locations to collaborate in real time to share thoughts and ideas.

Sharing applications amongst multiple users can be challenging from a technical standpoint. For example, some approaches in the past have required local execution of software that had to be installed on the computer of each participant. If some participants taking part in a collaboration did not have the required software, then they could not participate in the sharing until they acquired and installed the software. Other approaches utilize specialized plug-ins, extensions, or applets which, again, if a participant does not have such resources, they are unable to participate in the sharing. Local execution of software to permit application sharing also gives rise to challenges associated with maintaining synchronization of content and state as between the different computing devices, managing control and interaction, and maintaining and promoting security.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

DETAILED DESCRIPTION

Overview

Figure 1:
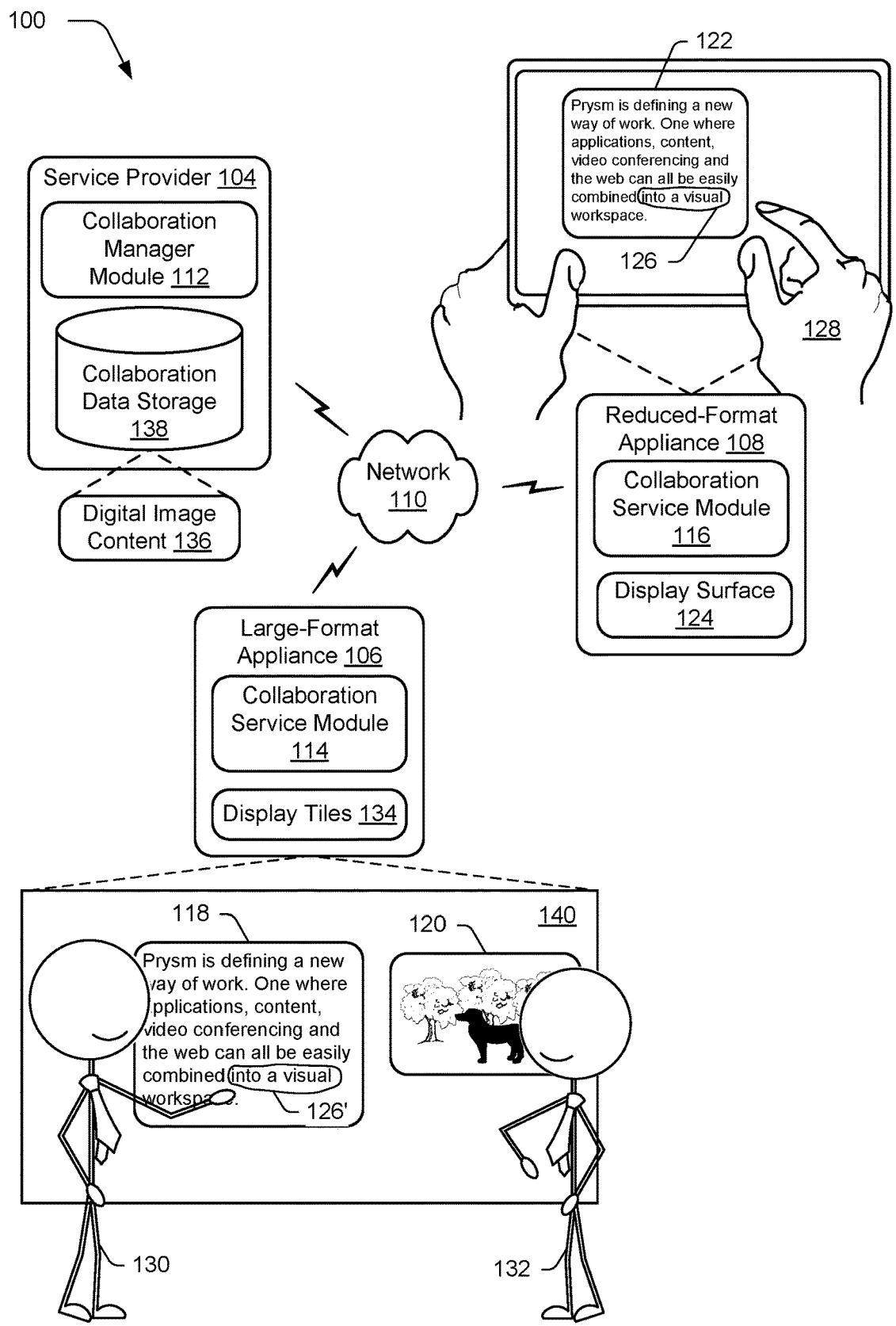
FIG. 1 is an illustration of a collaboration system operable to employ techniques described herein.

In the discussion below, innovative techniques are described to implement shared applications, including a shared application that permits retrieval, presentation and traversal of information resources. The innovative techniques can be applied to any suitable type of application. In operation, in at least some embodiments, any application a client appliance is running can be managed by a server in order to share out interactions with the application across a group of other client appliances participating in a collaboration. Any other individual client appliances are able to interact with the application without having to execute a local version of the application. That is, the server acts as manager of the running of the application, and the client appliances participating in the collaboration are then "video mirrors" of that application, as described below in more detail. It is to be appreciated and understood that the application can be hosted by one of the collaborating client appliances. Alternately or additionally, the application can be hosted by the server. In some embodiments, the client appliances note where on the display the user clicks or performs a function, and the server knows the user pointer action and location and performs that function from a server hosted application. Alternately or additionally, in situations where the client appliance hosts the application, the server can capture the client activities performed on the client appliance-hosted application. In some embodiments, the region in which the application appears on the client appliance is determined by the server or client, and the identified region undergoes a screen capture video which is provided to the server. This video is then shared out by the server to the other client appliances in a collaboration in the same location of the canvas as determined by the host client. Since the server knows where any interactions appear on the canvas, this information can be shared with the host client application as if an individual user were locally providing input, e.g., clicking, dragging, and the like, within that application. The server thus captures video of the activity and then shares video with all of the client appliances in the collaboration. The video is then rendered on the various other client appliances to provide a shared interaction experience in correlation to x-y locations within the collaboration identified workspace. Any of the client appliances can provide input, which is then received, processed and shared out by the server as described below in more detail. As noted above, the experience can be applied to any application that can be executed by a client appliance including both web-based applications and applications that are not web based. The innovations described herein can thus bring people, their applications, and their data into a single environment, regardless of the tools employed by the corresponding client appliances. The applications can be for any purpose, and can be shared and interacted with by multiple parties across a network, such as the Internet. The applications do not have to be a cloud-based, and do not have to be part of the same ecosystem. In one or more embodiments, the innovative solutions are multi-threaded and support heterogeneous, open ecosystem tools. This means that the solutions can be applied across different platforms and, in this sense, are platform agnostic. The innovative solutions do not necessarily require a meeting, which improves upon past approaches in which a meeting is required in order to share in the manner described herein. That is, the innovations can be applied without the need for a formal collaboration. For example, the same user might have two different displays that are used to provide the shared experience. The innovative solutions are persistent and allow simultaneous rendering of persistent data alongside real-time applications.

One such web-based application is a web browser which permits retrieval, presentation and traversal of information resources on the World Wide Web. An information resource can be identified by a Uniform Resource Identifier (URI/URL) that may be a web page, image, video or other piece of content. Web browsers can also be used to access information provided by web servers in private networks or files in file systems. The innovative techniques enable multiple participants at different locations to both see and interact with assets such as a web-based content. The innovative techniques centralize the functionality of an application that is to be shared. A shared application is executed, during a collaboration, at a centralized location by a centralized server in a manner that does not require any local resources to create an application instance. A software camera is utilized to capture video of the executing application which is then streamed to collaboration participants or, more accurately, each collaboration appliance. The video is then rendered on each appliance so that collaboration participants can then interact with the video in a similar manner as they would interact with the application. Interactions at each appliance are captured as events which are then relayed back to the centralized server. The centralized server then processes the events and executes the interactions on the shared application. These executed interactions are then captured by the software camera and streamed back out to the appliances where they are rendered. Thus, two or more clients executing on different appliances can interact with the shared application by way of the centralized server that executes the shared application. The interactions at the different applications can occur at the same time, or the interactions can be serialized such that only one client is allowed to interact with the shared application at a time. That is, in at least some embodiments, a control mechanism can be employed that passes control amongst the participants to ensure that there are no collisions, such as one that might arise if two participants were to interact with the video at the same time and in different, inconsistent manners. As noted above, interactions are captured as events, which are then relayed back to the centralized location, processed, and executed by the shared application. Again, the software camera captures this execution which is then streamed to the collaboration participants, and so on.

In at least some embodiments, security is promoted when control is passed among participants by dehydrating state information associated with a particular user from whom control is passed. The next participant's state information is maintained by the shared application so long as the next participant has control. However, upon passing control to a further participant, the current participant's state information is dehydrated from the shared application, and so on. If control returns to a participant whose state information has been dehydrated, their particular state information is rehydrated as long as they maintain control. A particular participant's state information can be maintained in the event the participant exits a particular collaboration session so that upon return, if the participant receives control of the shared application, their state information can be rehydrated. So essentially, for example, when a user has control of a browser, the user's state information is loaded into the browser that they are controlling. When the user relinquishes control, their state information is captured and stored (i.e. dehydrated) so that it can be reloaded (i.e. rehydrated) once they again regain control of the browser.

The innovative techniques provide an easily scalable solution due, in part, to the fact that local computing resources are not needed to render an instance of the shared application. Thus, it is unnecessary for any specialized software to be installed on a computing appliance in order to share an application. Furthermore, participant state information and user data is protected because it is not shared when application control passes to a new participant. Furthermore, because the results of application interactions are transmitted as a video stream, each local appliance is relieved of the burden of having to create, modify, and maintain application-related structures, such as a document object model (DOM) in the case when the application is a web browser. Offloading the burden of maintaining application-related structures on local appliances greatly reduces the computing complexity for the local appliances and thus, improves the efficiency with which local appliances can participate in a collaboration. Application-related structures refer to the various software support infrastructure that is typically created locally to support local execution of an application. So, for example, in the case of a web browser, such would include a document object model which is a tree structure in which each node is an object representing part of the document. The objects can be manipulated programmatically and any visible changes occurring as a result may then be reflected in the display of the document. Other application-related structures in the browser context can include layout engines that parse HTML into a DOM. Applications that are different from browsers, such as other web-based or non web-based applications, may have different application-related structures which, as a result of the innovations described herein, need not necessarily be created, maintained and operated locally.

It is to be appreciated and understood, however, that the innovative techniques can be utilized in any suitable streaming environment and, not necessarily, a virtual collaboration between multiple different appliances.

Shared workspaces enable virtual collaboration of remote and locally connected appliances having a variety of different hardware characteristics, such as tablet computers, wall displays, computing devices, mobile phones, and so forth. These appliances may also include a variety of software having differing characteristics usable to render assets as part of the shared workspace, such as particular word processors, presentation software, drawing applications, and so forth. Examples of assets include documents, images, video conferencing, and so forth as further described in the following.

Virtual collaborations that utilize shared workspaces typically use a network connection to place the remote and locally connected appliances into communication with one another. The network connection can, in many instances, utilize an Internet connection. So, for example, multiple appliances located in one location may participate in a collaboration with multiple appliances located in a separate, remote location. Each location can maintain a network connection to the Internet.

In some instances, a virtual collaboration can employ one or more large-format appliances and one or more reduced-format appliances. In yet other instances, a virtual collaboration may involve multiple reduced-format appliances such as a collaboration amongst multiple employees from their desktop or laptop devices. Thus, the displays amongst the collaboration users may vary. The workspace itself defines where the location of the scraped application appears. The "scraped application" refers to the application that is the subject of sharing. The application is "scraped" in the sense that input provided on the appliance hosting the application is captured as video, which is then forwarded to the other participating appliances as described above and below. A large-format appliance is typically configured to be mounted to a wall, for instance, and may be feature rich and configured to support a high resolution, network bandwidth, and hardware resources such as memory and processing. This large-format appliance may also include an application configured to consume particular asset formats, such as to support word processing, drawing (e.g., CAD), and so forth. A reduced-format appliance, such as a tablet or mobile phone configured to be held by one or more hands of a user, however, may have reduced resolution, network bandwidth, and hardware resources when compared to the large-format appliance.

In some instances, a large-format appliance may upload, e.g., stream an asset to a service provider for sharing that is configured for consumption via a corresponding application, e.g., a particular word processor. In addition, the reduced-format appliances may also upload or stream assets to the service provider for sharing with other appliances participating in the collaboration. The techniques described herein enable multiple participants at different locations to both see and interact with assets such as web-based content. The innovative techniques centralize the functionality of an application that is to be shared. A shared application is executed, during a collaboration, at a centralized location in a manner that does not require any local resources to create an application instance. The innovative techniques provide an easily scalable solution due, in part, to the fact that local computing resources are not needed to render an instance of the shared application. Thus, it is unnecessary for any specialized software to be installed on a computing appliance in order to share an application. In the embodiments described below, a shared application in the form of a web browser is described. It is to be appreciated and understood, however, that this is merely for illustrative purposes. Accordingly, applications other than a web browser can be utilized to implement the innovative techniques described herein.

In the following discussion, an example environment is first described that may employ the techniques described herein. Example procedures are then described which may be performed in the example environment as well as other environments. Consequently, performance of the example procedures is not limited to the example environment and the example environment is not limited to performance of the example procedures.

Example Environment

FIG. 1 is an illustration of a collaboration system 100 in an example implementation that is configured to implement one or more aspects of the techniques described herein. As shown, collaboration system 100 includes, without limitation, a service provider 104 and appliances that are used to implement a shared workspace, illustrated examples of which include a large-format appliance 106 and a reduced-format appliance 108, each of which are communicatively coupled via a network 110. Although large and reduced format appliances 106, 108 are described in relation to the following examples, it should be readily apparent that a plurality of appliances may be made up of appliances that support large or reduced formats, solely.

The service provider 104 is illustrated as including a collaboration manager module 112 and the appliances are illustrated as including respective collaboration service modules 114, 116 that together are representative of functionality implemented at least partially in hardware to support a shared workspace of a collaborative environment as further described in the following. Collaboration service modules 114, 116, for instance, may be configured as software such as applications, third-party plug-in modules, webpages, web applications, web platforms, and so on that support participation as part of a shared workspace. The collaboration manager module 112 is representative of functionality (e.g., implemented via software) that is usable to manage this interaction, examples of which are further described in relation to FIGS. 2-4. Although illustrated separately, functionality of the collaboration manager module 112 to manage the shared workspace may also be incorporated by the appliances themselves.

The collaboration service modules 114, 116, for instance, may be implemented as part of a web platform that works in connection with network content, e.g. public content available via the "web," to implement a shared workspace. A web platform can include and make use of many different types of technologies such as, by way of example and not limitation, URLs, HTTP, REST, HTML, CSS, JavaScript, DOM, and the like. The web platform can also work with a variety of data formats such as XML, JSON, and the like. The web platform can include various web browsers, web applications (i.e. "web apps"), and the like. When executed, the web platform allows a respective appliance to retrieve assets (e.g., web content) such as electronic documents in the form of webpages (or other forms of electronic documents, such as a document file, XML file, PDF file, XLS file, etc.) from a Web server (e.g., the service provider) for display on a display device in conjunction with the shared workspace.

The shared workspace is configured to share assets and user interactions with those assets. In the context of this disclosure, an "asset" may refer to any interactive renderable content that can be displayed on a display, such as on a display device of the large-format appliance 106 or reduced-format appliance 108, among others. Interactive renderable content is generally derived from one or more persistent or non-persistent content streams that include sequential frames of video data, corresponding audio data, metadata, flowable/reflowable unstructured content, and potentially other types of data.

Generally, an asset may be displayed within a dynamically adjustable presentation window. An example of this is illustrated presentation windows 118, 120 for the large-format appliance 106 and presentation window 122 as displayed for the reduced-format appliance 108. For simplicity, an asset and corresponding dynamically adjustable presentation window are generally referred to herein as a single entity, i.e., an "asset." Assets may comprise content sources that are file-based, web-based, or Live Source. Assets may include images, videos, web browsers, documents, renderings of laptop screens, presentation slides, any other graphical user interface (GUI) of a software application, and the like.

An asset generally includes at least one display output generated by a software application, such as a GUI of the software application. In one example, the display output is a portion of a content stream. In addition, an asset is generally configured to receive one or more software application inputs. The reduced-format appliance 108, for instance, may include a display device 124 having gesture detection functionality (e.g., a touch sensitive display device, a display device associated with one or more cameras configured to capture a natural user input, and so forth) to capture a gesture, such as an annotation 126 to circle text in a document made by one or more fingers of a user's hand 128.

With respect to the annotation, the annotation is then communicated and displayed on the large-format appliance 106 as annotation 126' that also circles corresponding text in a presentation window 118 that is viewable by users 130, 132 of that appliance. Thus, unlike a fixed image, an asset is a dynamic element that enables interaction with the software application associated with the asset, for example, for manipulation of the asset. For example, an asset may include select buttons, pull-down menus, control sliders, and so forth that are associated with the software application and can provide inputs to the software application.

As also referred to herein, a "shared workspace" is a virtual "digital canvas" or "digital ink canvas" on which assets associated therewith, and their corresponding content streams, are displayed within a suitable dynamic "viewport window". Thus, a shared workspace may comprise one or more associated assets (each asset displayed within a presentation window), whereby the entire shared workspace is displayed within a dynamically adjustable viewport window. A shared workspace may be displayed in the entire potential render area/space of a display device of the large-format appliance 106 and/or the reduced-format appliance 108, so that only a single shared workspace can be displayed on the surface thereof. In this case, the area of the viewport window that displays the shared workspace comprises the entire render area of the large-format appliance 106 and/or the reduced-format appliance 108. In other implementations, however, the shared workspace and the viewport window may be displayed in a sub-area of the total display area of the large-format appliance 106 and/or the reduced-format appliance 108 that does not comprise the entire render area of respective display devices of these appliances. For example, multiple shared workspaces may be displayed in multiple viewport windows on the large-format appliance 106 and/or the reduced-format appliance 108 concurrently, whereby each shared workspace and viewport window does not correspond to the entire display surface. Each asset associated with a shared workspace, and content stream(s) corresponding to the asset, are displayed in a presentation window according to defined dimensions (height and width) and a location within the shared workspace and viewport window. The asset and presentation window dimensions and location may also be user-adjustable. As also referred to herein, a "project" may comprise a set of one or more related shared workspaces.

The large-format appliance 106 in this example is formed using a plurality of display tiles 134, e.g., arranged to form a display wall. The service provider 104 includes digital image content 136, which is illustrated as stored in collaboration data storage 136, e.g., using one or more memory devices as further described in relation to FIG. 8. The service provider 104 may receive this digital image content 136 from a variety of sources, such as the reduced-format appliance 108, the large-format appliance 106, remotely via a third-party source via the network 110 (e.g., a website), or from an information network or other data routing device, and converts the input into image data signals. Thus, digital image content 136 may be generated locally, with the large-format appliance 106 or the reduced-format appliance 108, or from some other location. For example, when the collaboration system 100 is used for remote conferencing, digital image content 136 may be received via any technically feasible communications or information network, wired or wireless, that allows data exchange, such as a wide area network (WAN), a local area network (LAN), a wireless (Wi-Fi) network, and/or the Internet, among others as represented by network 110. The service provider 104, reduced-format appliance 108, and large-format appliance 106 may be implemented as one of more computing devices, such as part of dedicated computers, as one or more servers of a server farm (e.g., for the service provider 104 as implementing one or more web services), dedicated integrated circuit, and so on. These computing devices are configured to maintain instructions in computer-readable media and that are executable by a processing system to perform one or more operations as further described in relation to FIG. 8.

Display devices of the large-format appliance 106 and/or the reduced-format appliance 108 may include the display surface or surfaces of any technically feasible display device or system type, including but not limited to the display surface of a light-emitting diode (LED) display, a digital light (DLP) or other projection displays, a liquid crystal display (LCD), optical light emitting diode display (OLED), laser-phosphor display (LPD) and/or a stereo 3D display all arranged as a single stand-alone display, head mounted display or as a single or multi-screen tiled array of displays. Display sizes may range from smaller handheld or head mounted display devices to full wall displays. In the example illustrated in FIG. 1, the large-format appliance 106 includes a plurality of display light engine and screen tiles mounted in an array, which are represented by the display tiles 134.

In operation, the large-format appliance 106 displays image data signals received from the service provider 104. For a tiled display, image data signals 102 are appropriately distributed among display tiles 134 such that a coherent image is displayed on a display surface 138 of the large-format appliance 106. Display surface 140 typically includes the combined display surfaces of display tiles 134. In addition, the display surface 138 of large-format appliance 106 is touch-sensitive that extends across part or all surface area of display tiles 134. In one implementation, the display surface 140 senses touch by detecting interference between a user and one or more beams of light, including, e.g., infrared laser beams. In other implementations, display surface 140 may rely on capacitive touch techniques, including surface capacitance, projected capacitance, or mutual capacitance, as well as optical techniques (e.g., sensor in a pixel), acoustic wave-based touch detection, resistive touch approaches, and so forth, without limitation and thus may detect "touch" inputs that do not involve actual physical contact, e.g., as part of a natural user interface. Touch sensitivity of the display surface 138 enables users to interact with assets displayed on the wall implementing touch gestures including tapping, dragging, swiping, and pinching. These touch gestures may replace or supplement the use of typical peripheral I/O devices, although the display surface 140 may receive inputs from such devices, as well. In this regard, the large-format appliance 106 may also include typical peripheral I/O devices (not shown), such as an external keyboard or mouse.

The display surface 140 may be a "multi-touch" surface, which can recognize more than one point of contact on the large-format appliance 106, enabling the recognition of complex gestures, such as two or three-finger swipes, pinch gestures, and rotation gestures as well as multiuser two, four, six etc. hands touch or gestures. Thus, a plurality of users 130, 132 may interact with assets on the display surface 140 implementing touch gestures such as dragging to reposition assets on the screen, tapping assets to display menu options, swiping to page through assets, or implementing pinch gestures to resize assets. Multiple users 130, 132 may also interact with assets on the screen simultaneously. Again, examples of assets include application environments, images, videos, web browsers, documents, mirroring or renderings of laptop screens, presentation slides, content streams, and so forth. Touch signals are sent from the display surface 140 to the service provider 104 for processing and interpretation. It will be appreciated that the system shown herein is illustrative only and that variations and modifications are possible.

Figure 2:
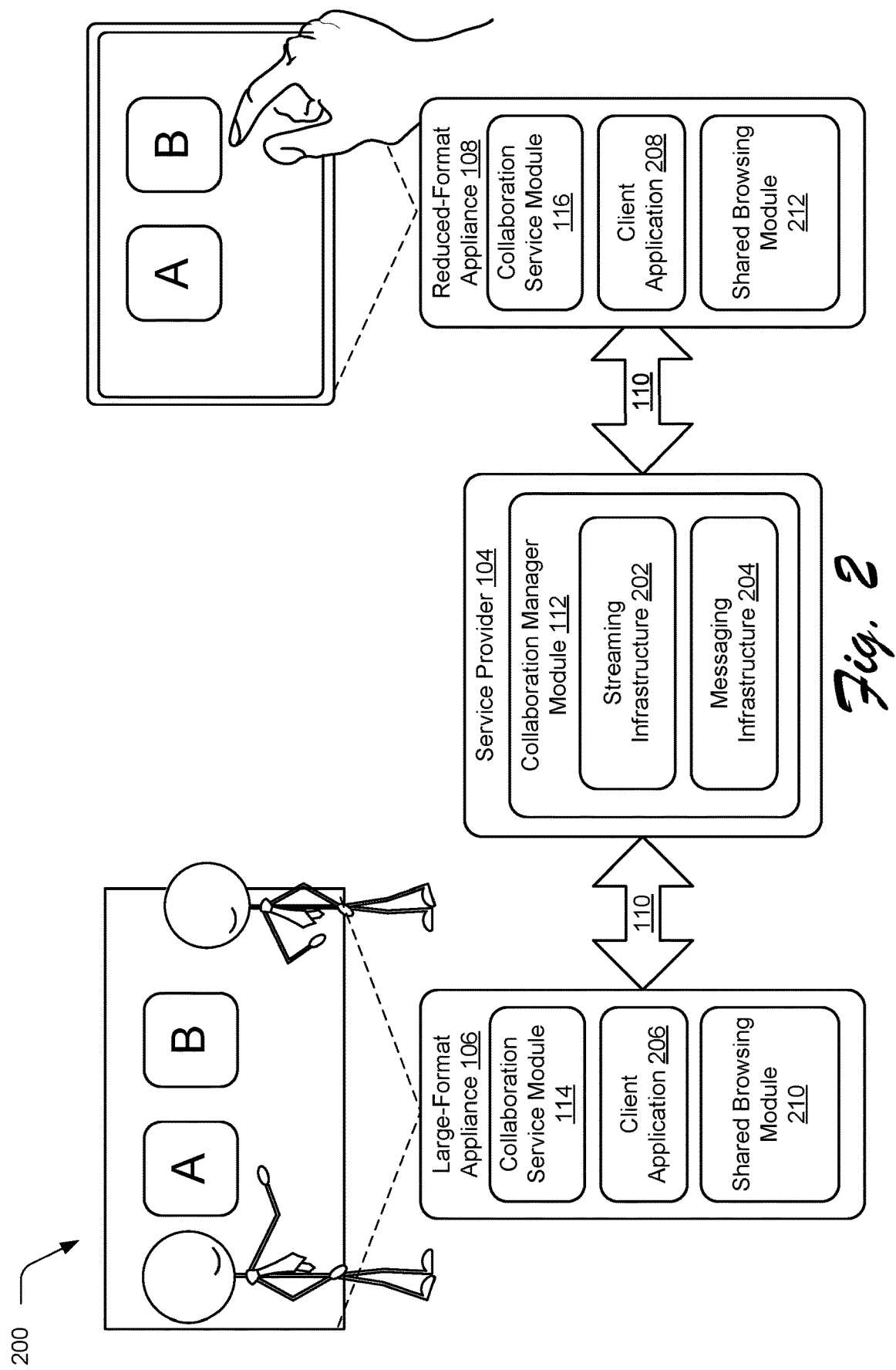
FIG. 2 is a conceptual diagram of a communication infrastructure of the collaboration system of FIG. 1 as sharing content streams across appliances.

FIG. 2 is a conceptual diagram of a communication infrastructure 200 of the collaboration system 100 of FIG. 1 as sharing content streams across appliances, e.g., across the large and reduced format appliances 106, 108 through interaction with the service provider 104. As shown, this communication infrastructure 200 includes, without limitation, the large-format appliance 106 and the reduced-format appliance 108 communicatively coupled to service provider 104 via a network 110. As shown in FIG. 2, communication infrastructure 200 of this example implementation includes streaming infrastructure 202 and messaging infrastructure 204 included as part of the collaboration manager module 112 to support communication of the collaboration service modules 114, 116 to implement the shared workspace. In this example, large-format appliance 106 includes a collaboration service module 114, one or more client applications 206 and a shared browsing module 210. The shared browsing module 210 can, more generally, be thought of as an "application module" when the inventive techniques described herein are used to share an application other than a web browser or other than a web-based application. Reduced-format appliance 108 includes a collaboration service module 116, one or more client applications 208 and a shared browsing module 212. Again, the shared browsing module 212 can be thought of, more generally, as an "application module" when the inventive techniques described herein are used to share an application other than a web browser or other than a web-based application. The shared browsing modules 210, 212 are responsible for communicating with a centralized service provider (also referred to as a centralized server) when a collaboration participant wishes to start an instance of a web browser during a collaboration. This enables the centralized service provider to create a "container" within which a browser, e.g., Chrome, is executed and shared amongst the collaboration participants. The browser is shared by way of a user interface element that is created on each appliance. As the browser is executed in the container, video of the browser execution is captured and shared with, i.e. streamed, to each appliance's user interface element which, in turn, plays the video and accepts user interactions. The user interaction is captured in the form of events that take place at locations on the video and are then sent back to the container, as described in more detail below. In various embodiments, nothing in the video stream is editable, clickable or touchable. Rather, events associated with such types of inputs that occur at some coordinates in the rendered stream are captured and returned to the container for execution by the browser in the container. Thus, the user interface element on each appliance captures the user's interaction and an event that is relayed back to the container for actual execution by the browser. So, for example, if a user clicks on some random area of the screen that does not accept text and starts typing, nothing will happen because the user is interacting with an area whose corresponding coordinates do not correspond to an area that accepts text. However, if the user clicks on an area of the screen whose coordinates include a text box, any keystrokes will be captured and sent as events to the container for execution by the browser running in the container. Doing so enables multiple participants at different locations to both see and interact with assets such as a web-based content. That is, a collaboration participant may actively choose to create a shared browser. When this happens, the shared browsing module on the participant's appliance receives the user's input and communicates the desire to create a shared browser to the centralized service provider. The browser is then created by the centralized service provider within the container, and streamed to the requestor (i.e. the participant who caused the shared browser to be created), and any participants in the current collaboration session. The participant who is controlling the browser causes events to be emitted that are then relayed to the container at the centralized service provider, as described below in more detail. When the event is received by the container, the container creates a so-called synthetic user interface event that is sent to the browser. The synthetic user interface event is an event that signals to the executing browser that an action took place. This action corresponding to the event can then be executed by the browser in the container, and subsequently streamed back out to the participating appliances. In at least some embodiments, if ownership or control passes to another participant, that new participant causes events to be emitted while other participants of the session are passive consumers. In one or more embodiments, the browser is executed in the container in a full screen, fixed resolution so that its position and other coordinate information are known, e.g., X, Y, height, width and size. Any event that is generated within the user interface element of a participating appliance has its coordinates translated to the coordinate system of the browser running within the container. In one or more embodiments, the browser size in the container is always fixed and client-side video is scaled to fit the size set by the user, while maintaining a fixed aspect ratio, e.g., 6×9, such that the coordinates associated with each appliance can be reliably translated back to the container.

Thus, the centralized service provider centralizes the functionality of the web browser that is to be shared in a manner that does not require any local resources to create a local web browser instance. A software camera is utilized to capture video of the executing web browser at the centralized service provider. The software camera is a virtual camera implemented in software that is used to capture the video display or a region of the video display as a video stream. The video is then streamed to collaboration participants or, more accurately, each collaboration appliance. The video is rendered on each appliance so that collaboration participants can then interact with the video in the same manner as they would interact with the web browser. In one or more embodiments, a control mechanism passes control amongst the participants to ensure that there are no collisions, such as one that might arise if two participants were to interact with the video at the same time and in different manners. Web browser interactions are captured as events, which are then relayed back to the centralized service provider, processed, and executed by the shared web browser. Again, the software camera captures this execution which is then streamed to the collaboration participants.

Large-format appliance 106 is illustrated as sharing a content stream A, via communication infrastructure 200, with the reduced-format appliance 108. In response, reduced-format appliance 108 is configured to retrieve content stream A from communication infrastructure 200 and to display that content stream on a display device of the reduced-format appliance 108 with its content stream B. Likewise, reduced-format appliance 108 is configured to share content stream B, via communication infrastructure 200, with the large-format appliance 106. In response, the large-format appliance 106 is configured to retrieve content stream B from communication infrastructure 200 and to display that content stream on a display device of the large-format appliance 106 with its content stream A.

In this fashion, the large and reduced format appliances 106, 108 are configured to coordinate with one another via the service provider 104 to generate a shared workspace that includes content streams A and B. Content streams A and B may be used to generate different assets rendered within the shared workspace. In one embodiment, each of the large and reduced format appliances 106, 108 perform a similar process to reconstruct the shared workspace, thereby generating a local version of that shared workspace that is similar to other local versions of the shared workspace reconstructed at other appliances. As a general matter, the functionality of the large and reduced format appliances 106, 108 are coordinated by respective collaboration service modules 114, 116 and client applications 206, 208, respectively.

Client applications 206, 208 are software programs that generally reside within a memory (as further described in relation to FIG. 8) associated with the respective appliances. Client applications 206, 208 may be executed by a processing system included within the respective appliances. When executed, client applications 206, 208 set up and manage the shared workspace discussed above in conjunction with FIG. 2, which, again, includes content streams A and B. In one implementation, the shared workspace is defined by metadata that is accessible by both the large and reduced format appliances 106, 108. Each of the large and reduced format appliances 106, 108 may generate a local version of the shared workspace that is substantially synchronized with the other local version, based on that metadata (discussed below in relation to FIG. 3).

In doing so, client application 206 is configured to transmit content stream A to streaming infrastructure 200 for subsequent streaming to the reduced-format appliance 108. Client application 206 also transmits a message to the reduced-format appliance 108, via messaging infrastructure 204, that indicates to the large-format appliance 106 that content stream A is available and can be accessed at a location reflected in the message. In like fashion, client application 208 is configured to transmit content stream B to streaming infrastructure 202 for subsequent streaming to the large-format appliance 106. Client application 208 also transmits a message to the large-format appliance 106, via messaging infrastructure 204, that indicates to the large-format appliance 106 that content stream B is available and can be accessed at a location reflected in the message. The message indicates that access may occur from a location within streaming infrastructure 202.

Client application 206 may also broadcast a message via messaging infrastructure 204 to the reduced-format appliance 108 that specifies various attributes associated with content stream A that may be used to display content stream A. The attributes may include a location/position, a picture size, an aspect ratio, or a resolution with which to display content stream A on the reduced-format appliance 108, among others, and may be included within metadata described below in relation to FIG. 3. Client application 208 may extract the attributes from messaging infrastructure 204, and then display content stream A at a particular position on a display device of the reduced-format appliance 108, with a specific picture size, aspect ratio, and resolution, as provided by messaging infrastructure 204. Through this technique, the large-format appliance 106 is capable of sharing content stream A with the reduced-format appliance 108. The reduced-format appliance 108 is also configured to perform a complimentary technique in order to share content stream B with the large-format appliance 106.

Client applications 206, 208 are thus configured to perform similar techniques in order to share content streams A and B, respectively with one another. When client application 206 renders content stream A on a display device of the large-format appliance 106 and, also, streams content stream B from streaming infrastructure 202, the large-format appliance 106 thus constructs a version of a shared workspace that includes content stream A and B. Similarly, when client application 208 renders content stream B on a display device of the reduced-format appliance 108 and, also streams content stream A from streaming infrastructure 202, the large-format appliance 106 similarly constructs a version of that shared workspace that includes content streams A and B.

The shared browsing modules 210, 212 may be part of the client applications or may be a separate component.

The appliances (e.g., the large and reduced format appliances 106, 108) discussed herein are generally coupled together via streaming infrastructure 202 and messaging infrastructure 204. Each of these different infrastructures may include hardware that is cloud-based and/or co-located on-premises with the various appliance, which are both represented by network 110. However, persons skilled in the art will recognize that a wide variety of different approaches may be implemented to stream content streams and transport messages/messages between display systems.

Figure 3:
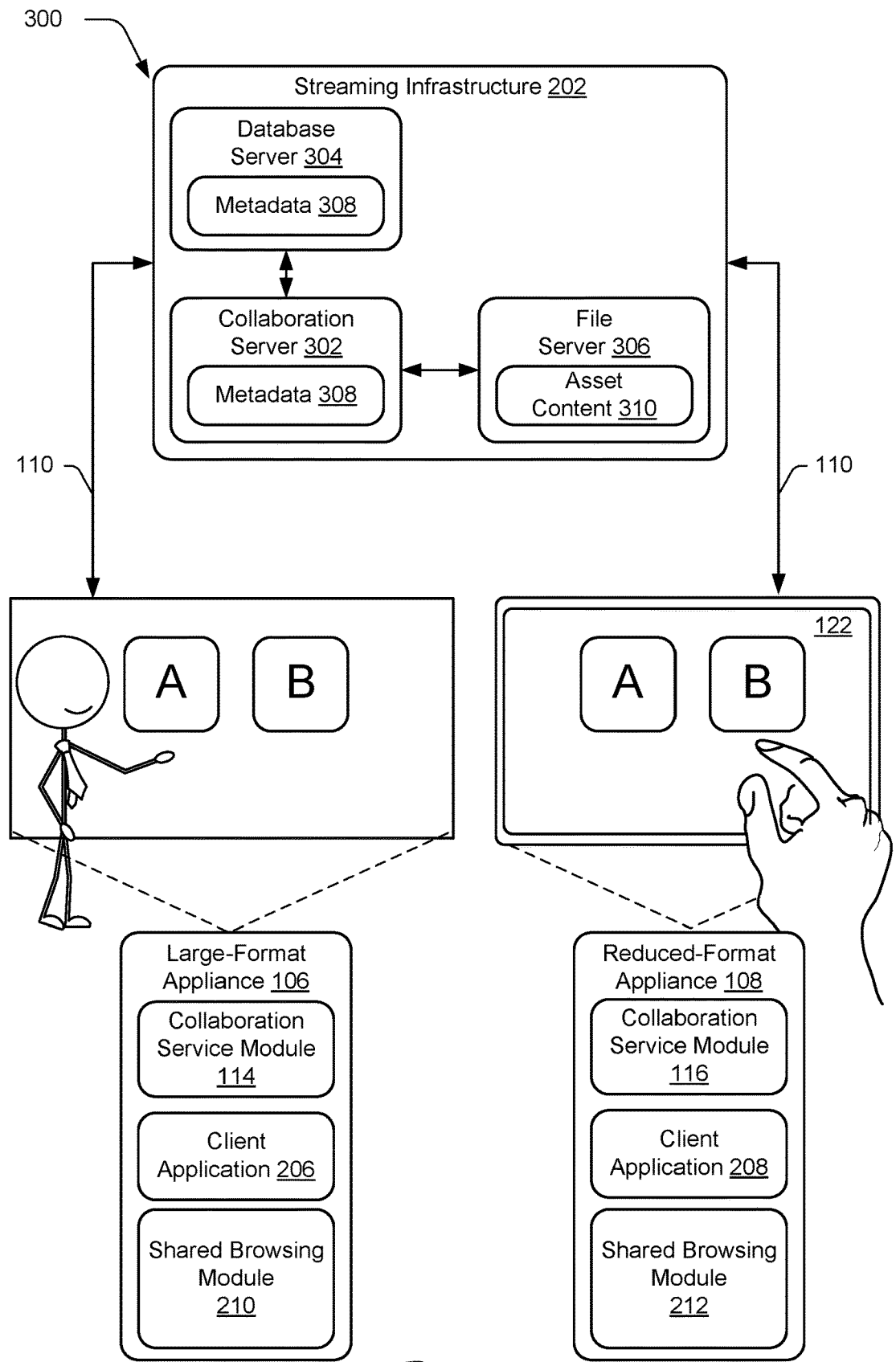
FIG. 3 depicts a streaming infrastructure of FIG. 2 in greater detail.

FIG. 3 depicts a block diagram 300 showing the streaming infrastructure 202 of FIG. 2 in greater detail. Streaming infrastructure 202 in this example includes a collaboration server 302, a database server 304, and a file server 306. Each server may comprise a computer device having a processor (such as processing system unit described in relation to FIG. 8) and a computer-readable medium such as memory, the processor executing software for performing functions and operations described herein. Collaboration server 302, database server 304, and file server 306 may be implemented as shown as separate and distinct computing devices/structures coupled to each other and to the appliances via a network 110. Alternatively, functionality of collaboration server 302, database server 304, and file server 306 may be implemented as a single computing device/structure in a single location (e.g., logically or virtually), or in any other technically feasible combination of structures. Further, one or more of collaboration server 302, database server 304, and/or file server 306 may be implemented as a distributed computing system. The network 110 may be via any technically feasible communications or information network, wired or wireless, that allows data exchange, such as a wide area network (WAN), a local area network (LAN), a wireless (WiFi) network, and/or the Internet, among others.

Collaboration server 302 coordinates the flow of information between the various appliances (e.g., the large and reduced format appliances 106, 108), database server 304, and file server 306. Thus, in some implementations, collaboration server 302 is a streaming server for the appliances. In some embodiments, the application program interface (API) endpoint for the appliances and/or business logic associated with streaming infrastructure 202 resides in collaboration server 302. In addition, collaboration server 302 receives requests from appliances and can send notifications to the appliances. Therefore, there is generally a two-way connection between collaboration server 302 and each of appliances, e.g., the large and reduced format appliances 106, 108. Alternatively or additionally, appliances may make requests on collaboration server 302 through the API. For example, during collaborative work on a particular project via collaboration system 100, an appliance may send a request to collaboration server 302 for information associated with an asset to display the asset in a shared workspace of the particular project.

Database server 304 (as well as collaboration server 302) may store metadata 308 associated with collaboration system 200, such as metadata for specific assets, shared workspaces, and/or projects. For example, such metadata may include which assets are associated with a particular shared workspace, which shared workspaces are associated with a particular project, the state of various settings for each shared workspace, annotations made to specific assets, etc. Metadata 308 may also include aspect ratio metadata and asset metadata for each asset. In some implementations, aspect ratio metadata may include an aspect ratio assigned to the project (referred to herein as the "assigned aspect ratio"). An aspect ratio assigned to a project applies to the shared workspaces of the project so that all shared workspaces of the project have the same aspect ratio assigned to the project. Asset metadata for an asset may specify a location/position and dimensions/size of the asset within an associated shared workspace.

The asset metadata indicates the position and size of an asset, for example, implementing horizontal and vertical (x and y) coordinate values. In some embodiments, the asset metadata may express the position and size of an asset in percentage values. In such implementations, the size (width and height) and position (x, y) of the asset is represented in terms of percent locations along an x-axis (horizontal axis) and y-axis (vertical axis) of the associated shared workspace. For example, the position and size of an asset may be expressed as percentages of the shared workspace width and shared workspace height. The horizontal and vertical (x and y) coordinate values may correspond to a predetermined point on the asset, such as the position of the upper left corner of the asset. Thus, when display surfaces of appliances have different sizes and/or aspect ratios, each asset can still be positioned and sized proportional to the specific shared workspace in which is it being displayed. When multiple display devices of multiple appliances separately display a shared workspace, each may configure the local version of the shared workspace based on the received metadata.

File server 306 is the physical storage location for some or all asset content 310 that are rendered as files, such as documents, images, and videos. In some embodiments, file server 306 can receive requests for asset content 310 directly from appliances. For example, an asset, such as a word-processing document, may be associated with a shared workspace that is displayed on a display device of a plurality of appliances, e.g., the large and reduced format appliances 106, 108. When the asset is modified by a user at the large-format appliance 106, metadata for a file associated with the asset is updated in file server 306 by collaboration server 302, the reduced-format appliance 108 downloads the updated metadata for the file from file server 306, and the asset is then displayed, as updated, on the gesture-sensitive display surface 124 of the reduced-format appliance 108. Thus, file copies of all assets for a particular shared workspace and project may be stored at the file server 306, as well as stored at each appliance that is collaborating on a project.

Each of the appliances is an instance of a collaborative multi-media platform disposed at a different location in a collaboration system 100. Each collaboration appliance is configured to provide a digital system that can be mirrored at one or more additional and remotely located appliances. Thus, collaboration clients facilitate the collaborative modification of assets, shared workspaces, and/or complete presentations or other projects, as well as the presentation thereof.

Figure 4:
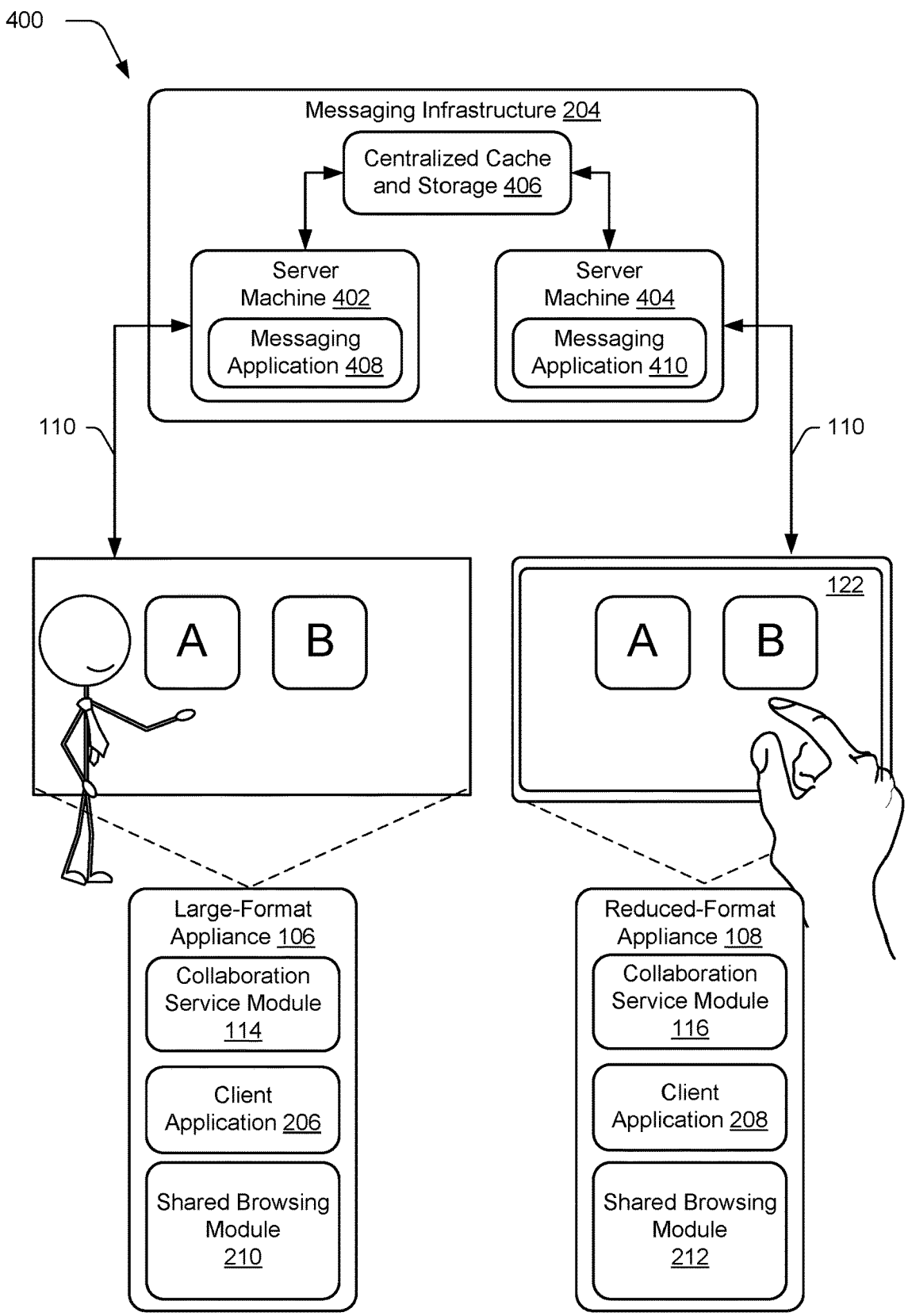
FIG. 4 depicts a messaging infrastructure of FIG. 2 in greater detail.

FIG. 4 depicts the messaging infrastructure 204 of FIG. 2 in greater detail. As shown, messaging infrastructure 204 includes server machines 402 and 404 coupled together via centralized cache and storage 406. Server machine 402 is coupled to the large-format appliance 106 and includes a messaging application 408. Server machine 404 is coupled to the reduced-format appliance 108 and includes a messaging application 410.

Figure 8:
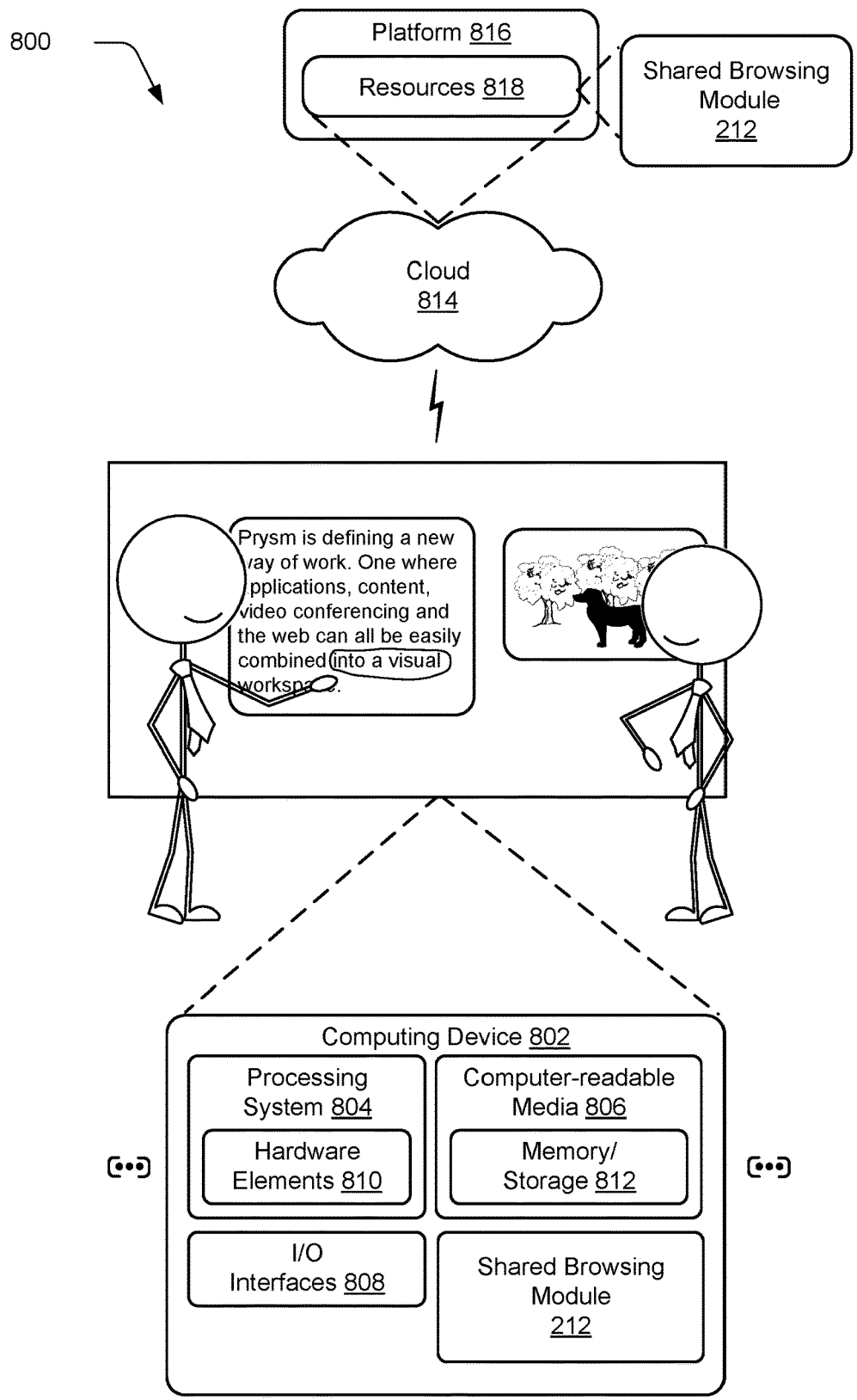
FIG. 8 illustrates an example system including various components of an example device that can be implemented as any type of computing device as described and/or utilize with reference to FIGS. 1-6 to implement embodiments of the techniques described herein.

Server machines 402 and 404 are generally cloud-based or on-premises computing devices that include memory and processing systems as further described in relation to FIG. 8 configured to store and execute messaging applications 408 and 410, respectively. Messaging applications 408 and 410 are configured to generate real-time socket connections with the large and reduced format appliances 106, 108, respectively, to allow messages to be transported quickly between the appliances. In one implementation, messaging applications 408 and 410 are implemented as ASP.NET applications and rely on signalR WebSockets to accomplish fast, real-time messaging.

Centralized cache and storage 406 provides a persistent messaging backend through which messages can be exchanged between messaging applications 408 and 410. In one embodiment, centralized cache and storage includes a Redis cache backed by a SQL database. Messaging applications 408 and 410 may be configured to periodically poll centralized cache and storage 406 for new messages, thereby allowing messages to be delivered to those applications quickly.

In operation, when the large-format appliance 106 transmits a message indicating that content stream A is available on streaming infrastructure 202, as described above, the large-format appliance 106 transmits that message to messaging application 408. Messaging application 408 may then relay the message to centralized cache and storage 406. Messaging application 410 polls centralized cache and storage 406 periodically, and may thus determine that the message has arrived. Messaging application 410 then relays the message to the reduced-format appliance 108. The reduced-format appliance 108 may then parse the message to retrieve an identifier associated with the large-format appliance 106, and then stream content associated with the large-format appliance 106 from streaming infrastructure 202.

Figure 5:
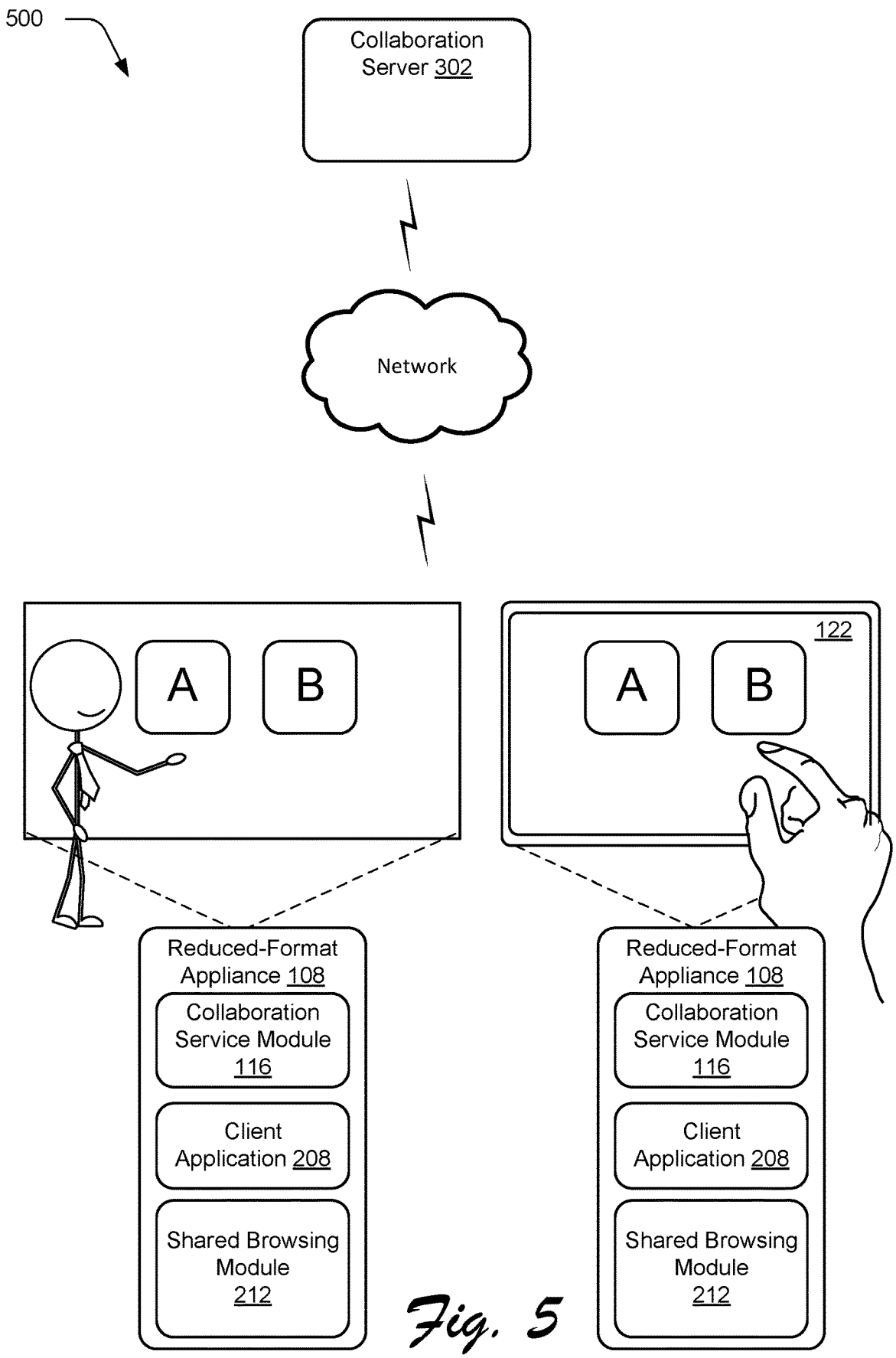
FIG. 5 depicts two appliances taking part in a collaboration by way of a collaboration server.

FIG. 5 illustrates an example environment 500 that includes a collaboration server 302 such as that described above, and multiple different reduced-format appliances 108 that are participating in a collaboration from a common location. In this instance, each of reduced-format appliances 108 shares a common network connection through which each can communicate with collaboration server 302. Although only two appliances are illustrated, more than two appliances can be located at any one particular location.

The common network connection that is shared by the reduced-format appliances 108 allows for content, including a shared web browser, to be shared amongst the appliances.

As noted above, innovative techniques are described to implement shared applications, including a shared web browser. In the example about to be described, a web browser is shared amongst participants participating in a collaboration. The innovative techniques provide an on-demand shared browser experience in which the collaboration participants can see and interact with the shared browser. That is, the shared browser can be created when needed or wanted by any of the collaboration's participants. The innovative techniques enable multiple participants at different locations to both see and interact with assets such as a web-based content. In operation, when a participant joins a project for a collaboration, the system knows that all of the participants who have joined the project are collaborating in a workspace. The workspace provides the mechanism by which a digital canvas can be utilized for collaborating. When a user, during the course of a collaboration, adds a web browser onto the associated workspace, as by interacting with the shared browsing module 210 or 212, to open the web browser, the system knows that because the participant is attempting to open the browser in the context of a collaboration, the system must implement a shared browsing experience.

To implement the shared browsing experience, the innovative techniques centralize the functionality of the web browser that is to be shared. This is done by dynamically creating or re-creating all of the back end resources that are needed to render the web browser centrally, so that it can be shared out amongst the participants.

In operation, a centralized service provider utilizes a "container". A container is a light weight virtualization environment that segregates network, file, and system processes from one another. The container allows for deployment of distributed applications, such as a shared web browser. The distributed applications can include many different types of applications including, by way of example and not limitation, 3-D computer-aided design applications, multimedia editing applications, word processing applications, spreadsheet applications, and the like. The container allows software to be packaged in a standardized unit and contains everything the software needs to run including code, runtime, system tools, system libraries, and the like. The container runs an instance of the web browser that is to be shared (or whatever application is being centrally executed) and includes custom functionality that enables the container to receive and then emulate input from each participant, such as a touch input, mouse input, or keyboard input. Doing so, in this manner, relieves each participating appliance from having to use any local resources to create a local web browser instance.

In one or more embodiments, the container employs a virtual frame buffer capture process that is implemented by a software camera that is utilized to capture video of the executing web browser. The virtual frame buffer implements, in software, the concept of a frame buffer—which is used by a hardware video card to prepare an image for display on a physical screen. In one or more embodiments, the captured video, captured as raw YUV frames, is then encoded into a H264 video stream and then streamed by the container to a live video streaming engine where it is transcoded into a different video format, e.g., Motion JPEG (MJPEG), and broadcast to registered participants. Although MJPEG is used in this specific example, any suitable format can be used, as will be appreciated by the skilled artisan. In this specific example, the live video streaming engine includes a cam server module and a port mapper module. The cam server module is implemented as a software component that receives, transcodes (e.g., from a H264 video stream to a MJPEG video stream), and broadcasts live video streams. The port mapper module is implemented as a software component that negotiates connections to the cam server module and distributes live video streams.

Accordingly, the captured video of the executing web browser is streamed to collaboration participants or, more accurately, each collaboration appliance. In some instances, the resolution of the streamed video can be changed depending on the type of appliance that is to receive the stream. For example, in limited bandwidth scenarios, the downstream framerate and/or bitrate can be throttled to conform to the available network conditions, e.g., a user of a mobile device utilizing a 3G, 4G, or LTE data connection via a cellular data provider. In addition, in some embodiments, in order to facilitate lower bandwidth scenarios, the frame rate of the streamed video can be reduced. For example, a queue of output frames can be maintained. If the queue continues to build, the number of frames per second can be reduced by half to throttle the connection. If the queue remains empty, the framerate can be slowly increased until the queue starts to build up and then the framerate can be reduced by half, with further reductions until a steady state is reached.

The video is then rendered on each appliance so that collaboration participants can then interact with the video in a similar manner as they would interact with the web browser. So, for example, in some embodiments, collaboration participants have registered an interest in receiving any data added to the workspace. When a shared browser is created, an asset is added to the workspace and includes a unique identifier. Each appliance is notified of the asset and its unique identifier. This asset can be added to each of the workspaces of the appliances. In this case, the added asset is a video player that knows how to render the stream that it obtains from the service. The asset obtains the URL of the stream so that it can obtain and render the stream.

In the illustrated and described embodiment, all of the functionality required to share the web browser is provided by the container at the centralized service provider—which is implemented as a cloud-based service. The functionality and resources utilized to share the web browser are created dynamically as part of the container. That is, when the container is created, a virtual touch device is created which serves as the desktop on which the browser which is to be shared will execute. If a state persistence store has not already been created, a state persistence store is created. The state persistence store allows state associated with the shared browser to be maintained, e.g., session cookies, etc. . . . The virtual frame buffer is then created and started and an event relay process is started. The event relay process enables events to be relayed from appliances to the container. The container then starts the web browser that is to be shared and its execution can be captured, encoded and streamed as described above and below. This provides fine granular scalability because every shared web browser collaboration session has an associated new container instance. Furthermore, when a participant wishes to invoke a web browser, as by interacting with the shared browsing module 210 or 212, a container can be created very quickly to provide a seamless user experience.

In one or more embodiments, a control mechanism is provided and passes control amongst the participants to ensure that there are no collisions, such as one that might arise if two participants were to interact with the video at the same time and in different, inconsistent manners. For example, when a user interacts with the rendered video stream, such as by typing, touching, clicking on the video stream (as by clicking on a video rendering of a link), and the like, an event is generated with metadata describing the action that was just taken. This event is sent to the event relay in the container. This event relay then generates a synthetic event within the container that is processed by the application (web-browser in this case) as if that action took place locally. So, if a user appears to click on a hyper link in the video stream, that event is sent to the corresponding browser in the container and to the user, a click appears to happen locally.

Thus, interactions with the video stream at the appliances are captured as events, which are then relayed back to event listeners at the centralized service provider, processed, and executed by the shared web browser. Again, the software camera at the container captures this execution which is then streamed to the collaboration participants as described above.

In at least some embodiments, security is promoted when control is passed among participants by dehydrating state information associated with a particular user from whom control is passed. The next participant's state information is maintained by the shared web browser so long as the next participant has control. However, upon passing control to a further participant, the current participant's state information is dehydrated from the shared web browser, and so on. If control returns to a participant whose state information has been dehydrated, their particular state information is rehydrated as long as they maintain control. A particular participant's state information can be maintained in the event the participant exits a particular collaboration session so that upon return, if the participant receives control of the shared application, their state information can be rehydrated.

The innovative techniques provide an easily scalable solution due, in part, to the fact that local computing hardware resources are not needed to render an instance of the shared web browser because the shared browser is streamed, as a video stream, in a standard format, e.g., MJPEG. Thus, it is unnecessary for any specialized software to be installed on a computing appliance in order to share a web browser. Furthermore, participant state information and user data is protected because it is not shared when application control passes to a new participant. For example, a participant who has control may enter a password into a website which the browser remembers while the participant has control. This information is not shared when control passes to another participant, thus avoiding a situation where another participant can use the previous participant's information to access the same website. Furthermore, because the results of application interactions, i.e., the results that represent execution of the events at the browser in the container received from the collaboration participants, are transmitted as a video stream, each local appliance is relieved of the burden of having to create, modify, and maintain application-related structures, such as a document object model for the web browser. Offloading the burden of maintaining application-related structures on local appliances greatly reduces the computing complexity for the local appliances and thus, improves the efficiency with which local appliances can participate in a collaboration.

Figure 6:
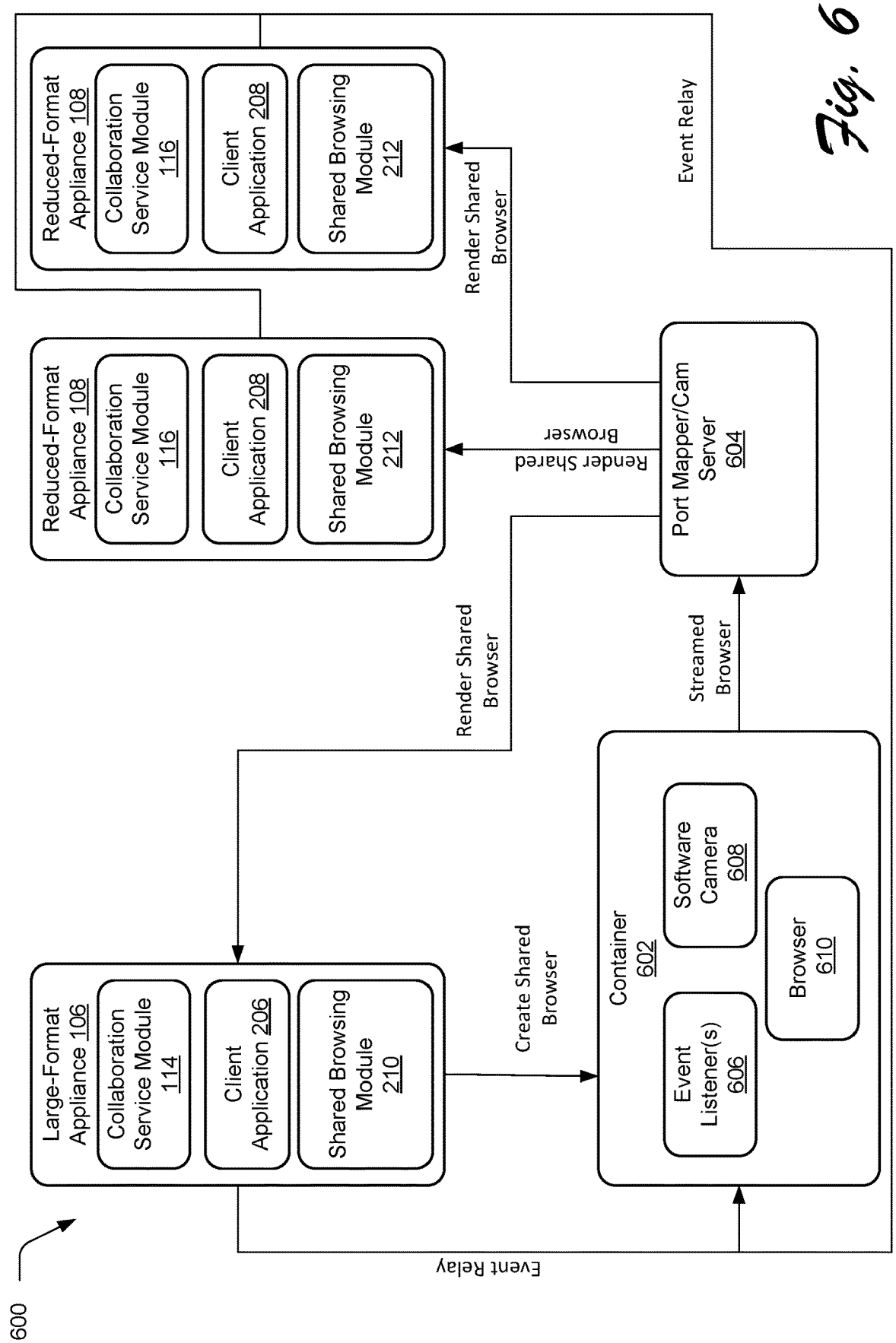
FIG. 6 depicts an example system that can be utilized to share applications, including a shared application that permits retrieval, presentation and traversal of information resources.

Consider now FIG. 6 which illustrates an example system in accordance with one embodiment, generally at 600. System 600 includes a large-format appliance 106 and two reduced-format appliances 108. Each of the appliances includes components such as those described above including, for the large-format appliance 106, a collaboration service module 114, client application 206, and shared browsing module 210; and, for the reduced-format appliances 108, a collaboration service module 116, a client application 208, and a shared browsing module 212. In addition, system 600 includes a container 602 and a port mapper/cam server 604. The container 602, which is supported by a centralized service provider, includes one or more event listeners 606, a software camera 608 and, when instantiated, a web browser 610 that can be shared out amongst the participants, i.e., appliances 106 and 108.

In this example, three users are participating in a collaboration, each of which is associated with one of the appliances. Assume that the user of large-format appliance 106 wishes to start a browser and add it to the collaboration. In this instance, the shared browsing module 210 receives the user's input and sends a message to the centralized service provider (which is not one of the multiple appliances participating in the collaboration), such as a backend service, that indicates that a shared browser is to be created, i.e. the "create shared browser" message that emanates from large-format appliance 106. The centralized service provider receives the message and, responsive to receiving the message instantiates a new container 602. The container 602 starts a virtual desktop that starts the browser 610, the event listeners 606 and the software camera 608. This enables the container to begin to capture the virtual desktop or browser 610 using the software camera 608. The software camera 608 captures frames of the browser 610 so that the frames can be streamed to the port mapper/cam server 604. In some instances, frames are captured at a capture rate which matches the playback rate at which the frames are played back. That is, in some instances, there is no transrate conversion. In other instances, transrate conversion can be utilized so that the capture rate need not match the playback rate. So, by virtue of indicating their desire to start a browser on large-format appliance 106, the shared browsing module 210 causes the container to be instantiated and for the components therewithin (i.e., the event listeners 606, software camera 608, and browser 610) to be started.

The event listeners 606 are components inside the container 602 that listen for various user input events. So, for example, if a user interacts with a video stream that represents the shared browser to simulate clicking on a link, typing in a text box, touching the screen, and the like, such event is reported or relayed back to the container 602 for processing by the event listeners 606. The events that are relayed back to the container result in actions being executed on browser 610. These executed actions are captured by the software camera 608 and streamed as video (i.e. the "streamed browser" arrow) from the container 602 to the port mapper/cam server 604. This streamed video is then provided by the port mapper/cam server 604 to each of the appliances 106, 108 and rendered as video (i.e., the "render shared browser" arrows from the port mapper/cam server 604 to each of the appliances). This provides a shared browser user interface through which the various participants can see and interact with the shared browser, subject to control mechanisms described above and below. Interactions with the rendered shared browser are captured as events by each appliance, which events are then relayed back to the container 602, processed by the event listeners 606 and executed by the browser 610, streamed back out, and so on.

As noted above, the port mapper negotiates connections to the cam server and distributes live video streams. The cam server receives, transcodes, and broadcasts live video streams to the appliances taking part in the collaboration. So, when the container 602 starts, the software camera 608 contacts the port mapper to indicate that it would like to start a new stream for the shared browser. The port mapper serves as a load balancer, in a sense, that is in front of all of the instances of the cam server. So, in order to scale the system to support more users, multiple cam servers can be utilized. The port mapper is basically responsible for balancing all of the loads across the different cam servers that may be instantiated. In one or more embodiments, there are N number of port mappers connected via a mesh network such that there is no single point of failure while negotiating a connection with a cam server. The port mapper selects a cam server that should be used for streaming from the container 602. The port mapper informs the container which cam server should receive the stream. At this point, the camera 608 can begin to stream the browser to the cam server.

During the startup process a separate event is sent to each of the appliances participating in the project or collaboration. The separate event informs each of the appliances that a new shared browser has been created and, on which cam server the shared browser is accessible i.e., the URL for the stream. Accordingly, each of the appliances in the collaboration knows how and where to access the stream associated with the shared browser.

Now that browser 610 is running and being streamed to the cam server, in at least some embodiments, control can be passed amongst the appliances to enable that, at any one time, only a single participant can interact with the shared browser. So, for example, if a particular user wishes to interact with the shared browser, they can signal browser control to the current user who has control of the shared browser. In the illustrated and described embodiment, the signal browser control is implemented as an event that goes through the event relay process which is essentially multi-directional as between the various appliances in the collaboration. The signal browser control can be implemented in connection with a user interface component that enables the current controller of the shared browser to allow someone else to take over control. That is, the current controller of the shared browser can either allow or deny control to be passed. So, for example, if a new user wishes to take control of the browser, they can click a button or otherwise indicate, through a user interface instrumentality, a request to control the browser. This request is relayed as an event to the current controller. The current controller can then be presented with a prompt that indicates that a new user would like to take control of the browser. The current controller can choose to allow or deny control to be passed. In at least some embodiments, the signal browser control can also start a timer which, after expiration, can automatically transfer control to the new user. This enables the collaboration to keep moving forward and maintain momentum.

In one or more embodiments, security is promoted when control is passed among participants by dehydrating state information associated with a particular user from whom control is passed. The next participant's state information is maintained by the shared browser so long as the next participant has control. However, upon passing control to a further participant, the current participant's state information is dehydrated from the shared browser, and so on. If control returns to a participant whose state information has been dehydrated, their particular state information is rehydrated as long as they maintain control. A particular participant's state information can be maintained in the event the participant exits a particular collaboration session so that upon return, if the participant receives control of the shared browser, their state information can be rehydrated. So, for example, if a particular participant has control of the shared browser 610 and logs into a website, there is some state that is stored in the shared browser 610. The state can include who the particular user is, which documents the user is able to access in their drive, and so on. Thus, the user may be authenticated to a number of different sites and associated information is stored in the browser session state as, for example, a session cookie.

In the illustrated and described embodiment, all of the session cookies for a particular user who controls the shared web browser are saved in a file on behalf of that particular user on the server. This file is attached to one and only one user in the collaboration. When control of the shared browser is passed, this file is saved and unloaded from the browser session. The new user who controls the shared browser will then not have access to any of the previous user's session state. However, their own state will be maintained and saved in a similar fashion in the event control is further passed to other users.

In the event control returns to a previous user whose session state has been saved in the manner described above, such information can be rehydrated so that they will again be logged into all of the previous websites that they had visited. In some embodiments, the file associated with the user's session state can be maintained even when a user logs out of a particular collaboration. If the user returns to the collaboration at some point in the future, their session state can be rehydrated in the manner described above.

In one or more embodiments, visual indications can be provided to indicate which participant has control of the shared web browser. For example, a small user interface instrumentality can be presented on the browser window to indicate who has current control. Such small user interface instrumentality can include, by way of example and not limitation, an icon displaying the user's picture, the user's name, the user's initials, and the like. In the event multiple browsers are being shared within the same collaboration, multiple different user interface instrumentalities can be presented to indicate who has current control of a particular respective shared web browser.

In the embodiments described above, the collaboration between appliances is supported by a collaboration service module and a client application that is dedicated to the collaboration, with the support of the centralized service provider. It is to be appreciated and understood, however, that the collaboration can be supported by a more portable HTML version of the client application. The HTML version of the application permits shared browsing or co-browsing while the corresponding appliance is connected to the collaboration through the browser. In this sense, the HTML version of the application provides a browser within a browser experience.

Having considered the embodiments described above, consider now example procedures in accordance with one or more embodiments.

Example Procedures

The following discussion describes techniques that may be implemented utilizing the previously described systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. In the illustrated and described embodiment, the operations are performed in a collaborative environment, such as that described above, in which multiple appliances can share a common network connection to participate in a shared workspace in which data can be streamed to other appliances also participating in the shared workspace.

Figure 7:
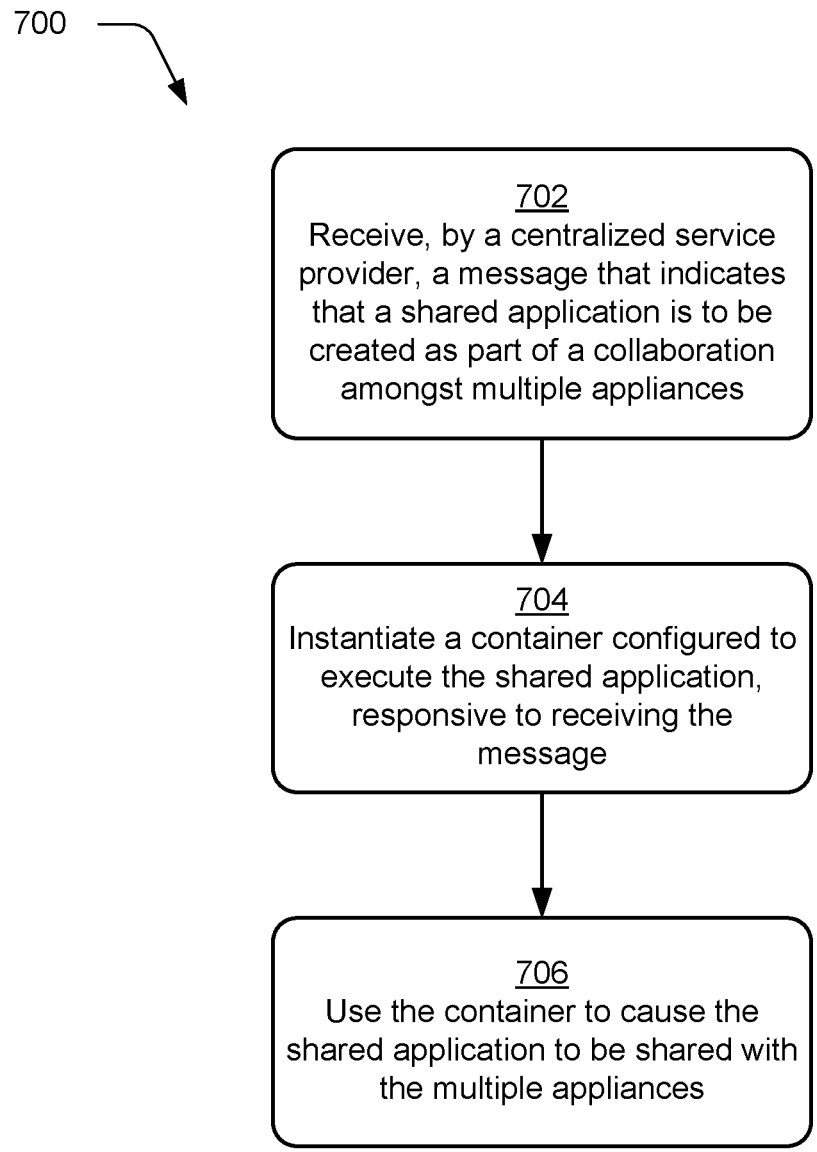
FIG. 7 is a flow diagram depicting a procedure in an example implementation in accordance with one or more embodiments.

FIG. 7 depicts a procedure 700 in an example implementation in which an application can be shared amongst multiple participants in a collaboration among associated appliances. Any suitable application can be the subject of a collaboration and, accordingly, can be shared. In but one example, an application in the form of a web browser can be shared amongst the participants.

At block 702, a message is received by a central service provider that indicates that a shared application is to be created as part of a collaboration amongst multiple appliances. An example of how this can be done is provided above. In the illustrated and described embodiment, the centralized service provider is not one of the multiple appliances participating in a collaboration. This means that the centralized service provider is not an appliance that has a human participant who is logged into or otherwise registered or participating as an active participant of the collaboration. At block 704, responsive to receiving the message, a container configured to execute the shared application is instantiated. An example of how this can be done is provided above, including various components that are used by the container to promote application sharing. At block 706, the container is used to cause the shared application to be shared with the multiple appliances. Examples of how this can be done are provided above.

Consider now some example use cases in accordance with one or more embodiments.

Example Use Cases

In the context of the use case examples, content includes at least a) all live Applications or the entire live Windows Desktop b) snapshots of application screens, the Desktop or clipboard data c) annotations made to live applications or data d) shared websites and e) data files capable of being rendered a particular workspace.

Use case 1: A new HR employee receives an email from IT with instructions to download and learn about the company's collaboration tool of choice, the Prysm Application Suite (PAS). Just as with his other Microsoft tools, he navigates to the Windows Application Store and finds, downloads and installs the PAS desktop client. When the PAS launches for the first time, it walks him through a series of panels with high-level summaries of the value proposition behind the tool and how to get started using it. PAS then presents him with his personal home screen where a predefined Project can be selected to learn more about the tool.

Use case 2: A new HR employee receives an email from IT with instructions to download and learn about the company's collaboration tool of choice, the Prysm Application Suite. Just as with his other Microsoft tools, he navigates to the Windows Application Store and finds, downloads and installs the PAS desktop client. When the PAS launches for the first time, it prompts him to personalize his presence settings, allowing him to change his stock photo, add a preferred nickname, and provide a space where he can let everyone know a little about his life outside of the office. PAS then presents him with his personal home screen with a menu of options: 1) learn about PAS 2) go to his PAS "Department Home Workspace" 3) browse message channels that might be of interest to him or 4) create a visual workspace. The new employee is able to learn at his own pace and experiment with this new tool, learn about his company's and departments procedures and policies through the rich interactive media placed in his department's home workspace, connect with people in and out of the department, and ultimately begin his own workspace to collaborate with those people.

Use case 3: A financial analyst is prepping for an upcoming meeting with her Team that will make use of PAS. She browses her data files using Windows File Explorer, selecting content, and with one click sends up to 10 files at once to the Finance Departments end-of-quarter audit Project.

Use case 4: Even with all these files she doesn't worry if there are last minute revisions prior to the meeting because the automated file update feature will take care of the update without having to login to PAS or the PAS Web Admin website to manually upload them.

Use case 5: An engineer has her personal laptop open, searching the Web for information relevant to the meeting she's currently participating in. She finds the content, and since it's just a static diagram she uses one click to send it straight into the current Project and Workspace using a snapshot function on her Browser window. It appears immediately on the Workspace that is open on the large format display in the conference room. If it was a live Website the team needed, she would simply have copied the URL and opened a Browser in the Workspace via a website sharing function, all without getting up from the table, and without having to use an awkward on-screen keyboard or find the in-room keyboard.

Use case 6: A graphic artist is working remotely, and he wants to share and contribute content to a collaboration session happening in a conference room back at the office. The team is using S4B to connect audio and video, and he uses his software to share, modify and annotate the marketing materials in real-time. The graphic artist is alternately sharing applications on his desktop, the entire desktop itself, and his secondary desktop when a separate space for private work is required. Additionally, anything shared on the display in the room, from personal devices via WSS, or plugged-in devices via HDMI or QuadLynk, to content within the Project, is shared back to the graphic artist via a visualization tool. The graphic artist is using one of the new MS Surface Studio computers, creating rich, beautiful content using the MS pen and Surface Dial and with no on-desktop UI.

Use case 7: A supplier and a buyer are in geographically separate locations, and the buyer is a Prysm PAS customer. They are using Google Docs for simultaneous editing a BOM, and they want to get agreement on proposed component changes with the buyer's boss in a conference room at a third location. The three of them discuss the content using S4B for audio and video, and because the buyer has the document open, they use the collaboration software to share it with the boss and make changes in real time. Even though the supplier doesn't have collaboration software, collaboration software is used to bridge her current collaboration toolset out to a wider audience.

Use case 8: Two astronomers are in geographically separate locations, at their respective desks, using disparate tool sets that are not web based or otherwise simultaneously viewed, let alone edited. They use S4B for audio, video, chat, and file transfer, and they both share out their applications, live, into the visualization tool. They can see each other's work, in real time. Once they have reviewed, annotated, revised and coordinated their respective observations, they snapshot the updated materials into the workspace so others in the Project can come along later to see the latest findings on intergalactic dust.

Use case 9: Our new HR employee has mastered PAS and is looking to contribute to a new office-space design that is underway as part of a full-building re-model. Having been invited to the PAS "HQ Remodel" Project, he believes he might have some alternate ideas to the out-moded cube-farm being proposed. He uses PAS to chat with a couple of the younger members of the HR team, and they trade photos and floor plan graphics in the channel, comparing and contrasting them to existing plans, and realize they need a space to compare plans side-by-side, and visualize how an alternate plan might fit in the constraints of the facility layout. They create a Prysm workspace to visualize the implementation, and since it works surprisingly well, they invite their boss to view their work by sending a link to the Project/Workspace they have created. When the Boss sees it, she uses the in-project PAS audio capability to discuss refinements in real-time with the authors. She quickly determines that it's probably a stronger space that could appeal to the younger workers they are trying to attract, and should be considered as part of the HQ Remodel. As owner of the PAS HQ Remodel Project, she is able to import the new workspace with the alternate plans, and have them be considered along-side the other workspaces.

Having considered example use cases in accordance with one or more embodiments, consider now an example system and device that can be utilized to implement the described embodiments.

Example System and Device

FIG. 8 illustrates an example system generally at 800 that includes an example computing device 802 that is representative of one or more computing systems and/or devices that may implement the various techniques described herein. This is illustrated through inclusion of the shared browsing module 212. The computing device 802 may be, for example, a server of a service provider, a device associated with a client (e.g., a client device), an on-chip system, and/or any other suitable computing device or computing system.

The example computing device 802 as illustrated includes a processing system 804, one or more computer-readable media 806, and one or more I/O interface 808 that are communicatively coupled, one to another. Although not shown, the computing device 802 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 804 is representative of functionality to perform one or more operations using hardware. Accordingly, the processing system 804 is illustrated as including hardware elements 810 that may be configured as processors, functional blocks, and so forth. This may include implementation in hardware as an application specific integrated circuit or other logic device formed using one or more semiconductors. The hardware elements 810 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 806 is illustrated as including memory/storage 812. The memory/storage 812 represents memory/storage capacity associated with one or more computer-readable media. The memory/storage component 812 may include volatile media (such as random access memory (RAM)) and/or nonvolatile media (such as read only memory (ROM), Flash memory, optical disks, magnetic disks, and so forth). The memory/storage component 812 may include fixed media (e.g., RAM, ROM, a fixed hard drive, and so on) as well as removable media (e.g., Flash memory, a removable hard drive, an optical disc, and so forth). The computer-readable media 806 may be configured in a variety of other ways as further described below.

Input/output interface(s) 808 are representative of functionality to allow a user to enter commands and information to computing device 802, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 802 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 802. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 802, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 810 and computer-readable media 806 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 810. The computing device 802 may be configured to implement particular instructions and/or functions corresponding to the software and/or hardware modules. Accordingly, implementation of a module that is executable by the computing device 802 as software may be achieved at least partially in hardware, e.g., through use of computer-readable storage media and/or hardware elements 810 of the processing system 804. The instructions and/or functions may be executable/operable by one or more articles of manufacture (for example, one or more computing devices 802 and/or processing systems 804) to implement techniques, modules, and examples described herein.

The techniques described herein may be supported by various configurations of the computing device 802 and are not limited to the specific examples of the techniques described herein. This functionality may also be implemented all or in part through use of a distributed system, such as over a "cloud" 814 via a platform 816 as described below.

The cloud 814 includes and/or is representative of a platform 816 for resources 818. The platform 816 abstracts underlying functionality of hardware (e.g., servers) and software resources of the cloud 814. The resources 818 may include applications and/or data that can be utilized while computer processing is executed on servers that are remote from the computing device 802. Resources 818 can also include services provided over the Internet and/or through a subscriber network, such as a cellular or Wi-Fi network.

The platform 816 may abstract resources and functions to connect the computing device 802 with other computing devices. The platform 816 may also serve to abstract scaling of resources to provide a corresponding level of scale to encountered demand for the resources 818 that are implemented via the platform 816. Accordingly, in an interconnected device embodiment, implementation of functionality described herein may be distributed throughout the system 800. For example, the functionality may be implemented in part on the computing device 802 as well as via the platform 816 that abstracts the functionality of the cloud 814.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A computer-implemented method comprising:
receiving, by a centralized service provider, a message that indicates that a shared application that permits retrieval, presentation and traversal of information resources is to be created as part of a collaboration amongst multiple appliances, wherein the centralized service provider is not one of the multiple appliances participating in the collaboration;
responsive to receiving the message, instantiating a container at the centralized service provider, the container being configured to execute the shared application at a centralized location by the centralized service provider in a manner that does not require any local resources of the multiple appliances participating in the collaboration to execute an instance of the shared application on a respective one of the multiple appliances;
using the container to cause the shared application to be shared with the multiple appliances by executing actions on the shared application by the centralized service provider, capturing executed actions as video, and causing the video of the captured executed actions to be streamed to each of the multiple appliances;
responsive to control of the shared application being passed from one user to another, dehydrating collaboration session state information associated with a particular user from whom control is passed, said dehydrating comprising saving said particular user's collaboration session state information so that when control is passed to said another user, said another user will not have access to any of said particular user's collaboration session state information, said collaboration session state information including authentication information associated with said particular user;
executing the shared application;
receiving a screen capture video that captures client activity performed on the executing application; and
providing the screen capture video to the multiple appliances.

2. The method as described in claim 1, wherein said using comprises capturing video of execution of the shared application using a software camera and streaming the captured video to a server configured to share the captured video with the multiple appliances.

3. The method as described in claim 1, wherein said using comprises using one or more event listeners to listen for user events associated with an appliance user's interaction with the shared application and causing said user's interaction to be executed on the shared application.

4. The method as described in claim 1, wherein said using comprises using one or more event listeners to listen for user events associated with an appliance user's interaction with the shared application and causing said user's interaction to be executed on the shared application; capturing video of execution of the appliance user's interaction with the shared application using a software camera; and streaming the captured video to a server configured to share the captured video with the multiple appliances.

5. The method as described in claim 1, wherein said using comprises contacting a port mapper to ascertain a server to which captured video of execution of the shared application is to be streamed.

6. The method as described in claim 1, wherein said using comprises:
    contacting a port mapper to ascertain a server to which captured video of execution of the shared application is to be streamed;
    capturing video of execution of the shared application using a software camera; and
    streaming the captured video to the server, wherein the server is configured to share the captured video with the multiple appliances.

7. The method as described in claim 1, wherein said using comprises:
    contacting a port mapper to ascertain a server to which captured video of execution of the shared application is to be streamed;
    sending an event to each of the multiple appliances informing each of the multiple appliances of the server from which the captured video may be accessed;
    capturing video of execution of the shared application using a software camera; and
    streaming the captured video to the server, wherein the server is configured to share the captured video with the multiple appliances.

8. The method as described in claim 1 further comprising enabling control to be passed amongst the multiple appliances to enable only one user to interact with the shared application at a time.

9. The method as described in claim 1 further comprising, responsive to control of the shared application being passed from one user to another, dehydrating state information associated with a particular user from whom control is passed.

10. The method as described in claim 9 further comprising responsive to control of the shared application being passed back to the particular user, rehydrating the state information.

11. A system implemented in a collaborative environment m which multiple appliances can share a common network connection to participate in a collaboration in which assets can be shared amongst the multiple appliances, the system comprising:
    a centralized service provider;
    one or more processors associated with the centralized service provider; one or more computer-readable media storing computer-executable instructions which, when executed by the one or more processors perform operations comprising:
        receiving, by the centralized service provider, a message that indicates that a shared application is to be created as part of the collaboration amongst multiple appliances, wherein the centralized service provider is not one of the multiple appliances participating in the collaboration;
        responsive to receiving the message, instantiating a container at the centralized service provider, the container being configured to execute the shared application at a centralized location by the centralized service provider in a manner that does not require any local resources of the multiple appliances participating in the collaboration to execute an instance of the shared application on a respective one of the multiple appliances;
        using the container to cause the shared application to be shared with the multiple appliances by executing actions on the shared application by the centralized service provider, capturing executed actions as video, and causing the video of the captured executed actions to be streamed to each of the multiple appliances;
        responsive to control of the shared application being passed from one user to another, dehydrating collaboration session state information associated with a particular user from whom control is passed, said dehydrating comprising saving said particular user's collaboration session state information so that when control is passed to said another user, said another user will not have access to any of said particular user's collaboration session state information, said collaboration session state information including authentication information associated with said particular user;
        executing the shared application;
        receiving a screen capture video that captures client activity performed on the executing application; and
        providing the screen capture video to the multiple appliances.

12. The system as described in claim 11, wherein said using comprises capturing video of execution of the shared application using a software camera and streaming the captured video to a server configured to share the captured video with the multiple appliances.

13. The system as described in claim 11, wherein said using comprises using one or more event listeners to listen for user events associated with an appliance user's interaction with the shared application and causing said user's interaction to be executed on the shared application.

14. The system as described in claim 11, wherein said using comprises using one or more event listeners to listen for user events associated with an appliance user's interaction with the shared application and causing said user's interaction to be executed on the shared application; capturing video of execution of the appliance user's interaction with the shared application using a software camera; and streaming the captured video to a server configured to share the captured video with the multiple appliances.

15. The system as described in claim 11, wherein said using comprises contacting a port mapper to ascertain a server to which captured video of execution of the shared application is to be streamed.

16. The system as described in claim 11, wherein said using comprises:
    contacting a port mapper to ascertain a server to which captured video of execution of the shared application is to be streamed;
    capturing video of execution of the shared application usmg a software camera; and streaming the captured video to the server, wherein the server IS configured to share the captured video with the multiple appliances.

17. The system as described in claim 11, wherein said using comprises:

contacting a port mapper to ascertain a server to which captured video of execution of the shared application is to be streamed;

sending an event to each of the multiple appliances informing each of the multiple appliances of the server from which the captured video may be accessed;

capturing video of execution of the shared application usmg a software camera; and streaming the captured video to the server, wherein the server IS configured to share the captured video with the multiple appliances.

18. The system as described in claim 11 further comprising enabling control to be passed amongst the multiple appliances to enable only one user to interact with the shared application at a time.

19. One or more computer-readable media storing computer-executable instructions which, when executed by the one or more processors, perform operations comprising:

receiving, by a centralized service provider, a message that indicates that a shared application is to be created as part of a collaboration amongst multiple appliances, wherein the centralized service provider is not one of the multiple appliances participating in the collaboration;

responsive to receiving the message, instantiating a container at the centralized service provider, the container being configured to execute the shared application at a centralized location by the centralized service provider in a manner that does not require any local resources of the multiple appliances participating in the collaboration to execute an instance of the shared application on a respective one of the multiple appliances;

using the container to cause the shared application to be shared with the multiple appliances by executing actions on the shared application by the centralized service provider, capturing executed actions as video, and causing the video of the captured executed actions to be streamed to each of the multiple appliances;

responsive to control of the shared application being passed from one user to another, dehydrating collaboration session state information associated with a particular user from whom control is passed, said dehydrating comprising saving said particular user's collaboration session state information so that when control is passed to said another user, said another user will not have access to any of said particular user's collaboration session state information, said collaboration session state information including authentication information associated with said particular user;

executing the shared application;

receiving a screen capture video that captures client activity performed on the executing application; and providing the screen capture video to the multiple appliances.

20. The one or more computer-readable media as described in claim 19, wherein the shared application comprises an application that permits retrieval, presentation and traversal of information resources.

* * * * *